UNITED STATES PATENT OFFICE.

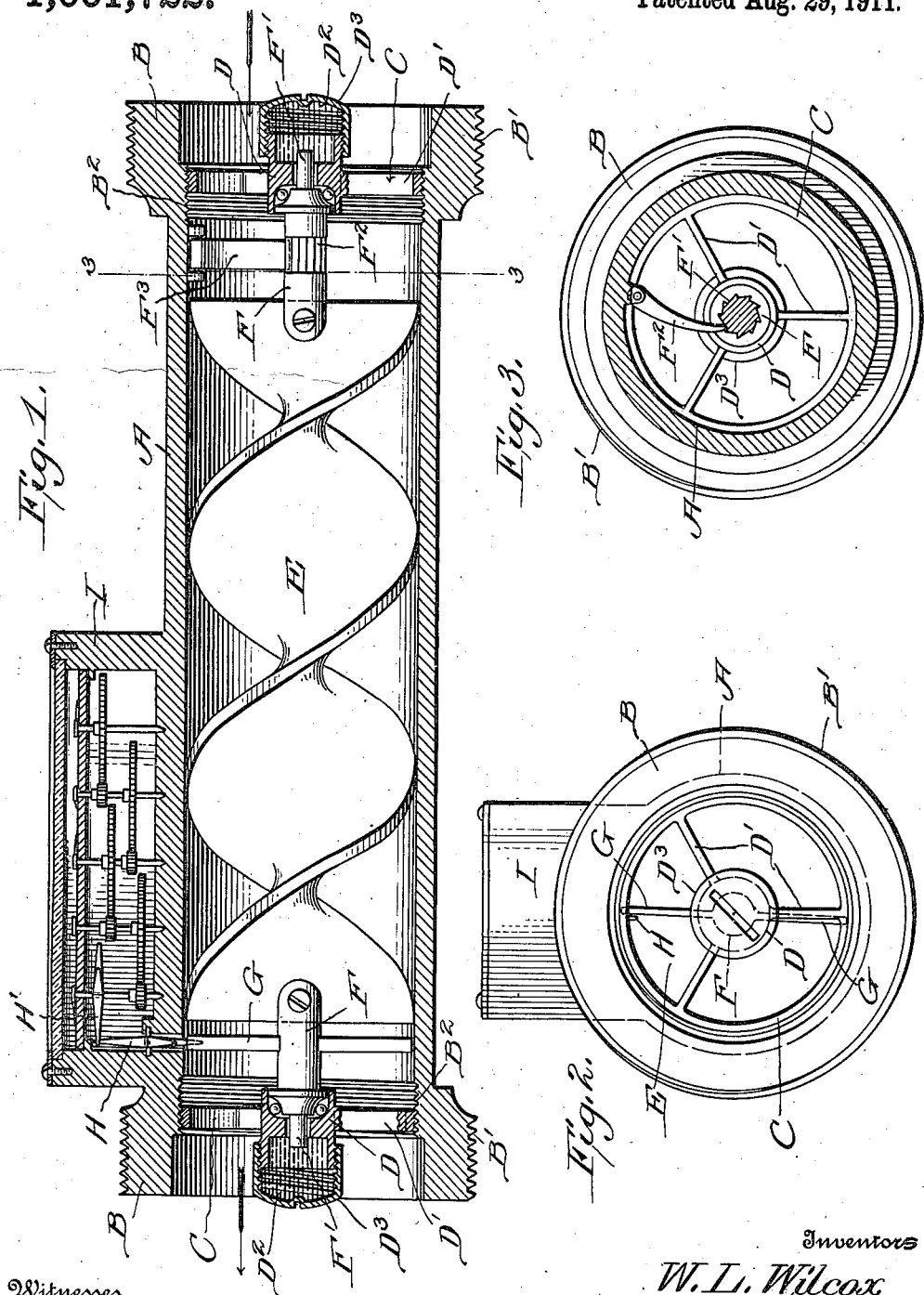

WILLIAM LLEWELLYN WILCOX AND WILLIAM JOSEPH BENSON, OF CLEVELAND, OHIO.

ROTARY METER.

1,001,722.   Specification of Letters Patent.   Patented Aug. 29, 1911.

Application filed February 23, 1910. Serial No. 545,488.

*To all whom it may concern:*

Be it known that we, WILLIAM L. WILCOX and WILLIAM J. BENSON, citizens of the United States, residing at Cleveland, in the county of Cuyahoga and State of Ohio, have invented a new and useful Improvement in Rotary Meters, of which the following is a specification.

This invention relates generally to rotary meters and although particularly adapted for gas can also be utilized as a water meter.

The object of our invention is to provide an exceedingly simple construction of meter, one that can be quickly and easily attached to the gas main or pipe and one which can be arranged in either a horizontal or vertical position and a still further object of the invention is to provide one in which all the moving parts are so arranged as to reduce the friction to a minimum thereby providing an exceedingly easily operated apparatus so that the device will operate equally as well under low pressure as under high pressure.

With these and various other objects in view, our invention consists in the novel features of construction hereinafter fully described and pointed out in the claim.

In the drawings forming a part of this specification: Figure 1 is a vertical sectional view of a rotary meter constructed in accordance with our invention. Fig. 2 is an end view, and Fig. 3 is a transverse sectional view on the line 3—3 of Fig. 1.

In carrying out our invention, we employ a section of brass tubing A having a collar B at each end, said collar being externally threaded at B' for connection with the gas main or pipe. The collar is also internally threaded as shown at B² in order to receive a ring C which carries a bearing D by means of the spider arms D' there being three in number thus permitting a ready flow of gas through the meter.

E indicates a spiral preferably constructed of aluminum and of such an external diameter as to fit snugly within the tube A and turn freely therein, said spiral being supported at each end by means of shafts F rigidly fastened to the opposite ends of said spiral and having their reduced ends F' journaled in the bearings D, said bearings having anti-friction balls arranged therein to reduce the friction to a minimum. It will also be noted that each bearing D is provided with a lubricant receiving socket or cavity D² in which any suitable lubricant, such as vaseline is placed and a screw cap D³ is provided to screw upon said socket for the purpose of retaining the lubricant therein. One of the shafts F is provided with a ratchet F² which is adapted to be engaged by a depending pivoted pawl F³, the purpose of said pawl and ratchet being to prevent the spiral rotating in the reverse direction. Upon the opposite shaft F is arranged an arm G which is of such length as to engage the depending portion of a star wheel H, said star-wheel constituting a part of the registry mechanism and it will be noted that this registry mechanism is arranged in a case I formed upon the top of the tube A and this star-wheel H transmits motion to its neighboring wheel H' and in that manner the entire registering system is carried out, the general construction of said register being the same as those now in common use for indicating the total amount of gas passing through the meter. It will be understood that the gas passes through this meter in the direction indicated by the arrow and in so doing rotates the spiral and this in turn operates the arm G which contacts with the star-wheel H and operates the register.

By reducing the number of parts to a minimum and arranging the shafts upon ball bearings abundantly lubricated we reduce the friction to a minimum and at the same time we protect all of the parts against dirt and other foreign matter which would ordinarily impair the meter and by doing away with gearing we provide a device cheap and simple to construct and highly efficient in operation. The device can also be quickly and easily attached by anyone and can be used in either a horizontal or vertical position as preferred.

The spiral can be made of other metal than aluminum if so desired and any suitable metal can be employed for the outside casing.

Having thus fully described our invention, what we claim as new and desire to secure by Letters Patent, is:—

A device of the kind described comprising a cylinder open at each end and interiorly threaded adjacent the ends, exteriorly threaded rings engaging said threaded end portions, bearings carried by said rings, each of said bearings having an inclosed lubricating socket, anti-friction devices mounted in said bearings, a spiral blade extending substantially the length of the cylindrical casing, shafts secured respectively to opposite end portions of said blade and journaled respectively in said bearings, a ratchet formed upon one of said shafts, a pawl pivotally mounted within the casing and engaging said ratchet, a registering device mounted upon the casing and comprising star wheels at right angles to each other, and radial arms carried by the other shaft and adapted to engage one of said star wheels.

WILLIAM LLEWELLYN WILCOX.
    WILLIAM JOSEPH BENSON.

Witnesses:
 AL. A. DUFFNER,
 MARGARET WILCOX.